(12) United States Patent
Sawa et al.

(10) Patent No.: US 10,449,979 B2
(45) Date of Patent: Oct. 22, 2019

(54) AIR SPRING AND BOGIE

(71) Applicants: Sumitomo Electric Industries, Ltd., Osaka-shi, Osaka (JP); KAWASAKI JUKOGYO KABUSHIKI KAISHA, Kobe-shi, Hyogo (JP)

(72) Inventors: Takayuki Sawa, Osaka (JP); Hideki Kitada, Osaka (JP); Yasuhiko Ura, Osaka (JP); Takehiro Nishimura, Kobe (JP); Keiichiro Kamura, Kobe (JP); Yoshi Sato, Sanda (JP)

(73) Assignees: SUMITOMO ELECTRIC INDUSTRIES, LTD., Osaka-shi, Osaka (JP); KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 219 days.

(21) Appl. No.: 15/528,547

(22) PCT Filed: Oct. 17, 2016

(86) PCT No.: PCT/JP2016/080696
§ 371 (c)(1),
(2) Date: May 22, 2017

(87) PCT Pub. No.: WO2018/073861
PCT Pub. Date: Apr. 26, 2018

(65) Prior Publication Data
US 2019/0084593 A1    Mar. 21, 2019

(51) Int. Cl.
*F16F 9/05*    (2006.01)
*B61F 5/10*    (2006.01)
*F16F 9/44*    (2006.01)

(52) U.S. Cl.
CPC ............... *B61F 5/10* (2013.01); *F16F 9/05* (2013.01); *F16F 9/052* (2013.01); *F16F 9/44* (2013.01)

(58) Field of Classification Search
CPC ..... F16F 9/05; F16F 9/052; B61F 5/10; B60G 11/27
See application file for complete search history.

(56) References Cited

U.S. PATENT DOCUMENTS

| 4,890,823 A | 1/1990 | Koschinat et al. |
| 5,921,532 A * | 7/1999 | Pierce ............... B60G 7/04 |
| | | 267/64.19 |

(Continued)

FOREIGN PATENT DOCUMENTS

| JP | 2000-035075 A | 2/2000 |
| JP | 2001-341641 A | 12/2001 |

(Continued)

*Primary Examiner* — Thomas J Williams
(74) *Attorney, Agent, or Firm* — Drinker Biddle & Reath LLP

(57) ABSTRACT

An air spring includes an outer cylindrical member, an inner cylindrical member combined with the outer cylindrical member, a diaphragm coupling the outer cylindrical member and the inner cylindrical member to each other, the diaphragm providing an internal space between the outer cylindrical member and the inner cylindrical member, a stopper assembly arranged in the internal space as being pivotable over the inner cylindrical member, the stopper assembly allowing suppression of movement of the outer cylindrical member toward the inner cylindrical member more than necessary, a pivoting mechanism pivoting the stopper assembly over the inner cylindrical member, and a space portion provided between the stopper assembly and the inner cylindrical member, the space portion allowing lowering in resistance in pivot of the stopper assembly.

9 Claims, 7 Drawing Sheets

(56) References Cited

U.S. PATENT DOCUMENTS

| | | | |
|---|---|---|---|
| 6,257,561 B1 | 7/2001 | Nakayama et al. | |
| 6,820,883 B2 * | 11/2004 | Lang | B60G 7/04 267/220 |
| 2013/0313764 A1 | 11/2013 | Fujimoto et al. | |
| 2019/0084594 A1 * | 3/2019 | Sawa | F16F 9/05 |
| 2019/0093729 A1 * | 3/2019 | Sawa | F16F 9/0454 |

FOREIGN PATENT DOCUMENTS

| | | |
|---|---|---|
| JP | 2006-194333 A | 7/2006 |
| JP | 2011-245937 A | 12/2011 |
| JP | 2012-17768 A | 1/2012 |
| JP | 2012-17769 A | 1/2012 |
| JP | 2012-145135 A | 8/2012 |
| JP | 2012-159146 A | 8/2012 |
| JP | 2016-56826 A | 4/2016 |

* cited by examiner

AIR SPRING AND BOGIE

TECHNICAL FIELD

The present invention relates to an air spring and a bogie.

BACKGROUND ART

An air spring making use of elasticity of compressed air has conventionally been known. For example, Japanese Patent Laying-Open No. 2000-035075 describes one example of a conventional air spring. The air spring described in this document has a height control mechanism for keeping an amount of compressive deformation (compression stroke) substantially constant.

Japanese Patent Laying-Open No. 2012-017769 also describes another example of a conventional air spring. The air spring described in this publication is an air spring with a stopper including downward-movement restriction means. Japanese Patent Laying-Open No. 2012-145135 describes yet another example of a conventional air spring. This air spring includes a stopper for restricting an amount of displacement in an up-down direction.

CITATION LIST

Patent Document

PTD 1: Japanese Patent Laying-Open No. 2000-035075
PTD 2: Japanese Patent Laying-Open No. 2012-017769
PTD 3: Japanese Patent Laying-Open No. 2012-145135

SUMMARY OF INVENTION

An air spring according to one manner of the present invention includes an outer cylindrical member, an inner cylindrical member, a diaphragm, a stopper assembly, a pivoting mechanism, and a space portion. The inner cylindrical member is combined with the outer cylindrical member. The diaphragm couples the outer cylindrical member and the inner cylindrical member to each other and provides an internal space between the outer cylindrical member and the inner cylindrical member. The stopper assembly is arranged in the internal space as being pivotable over the inner cylindrical member and can suppress movement of the outer cylindrical member toward the inner cylindrical member more than necessary. The pivoting mechanism pivots the stopper assembly over the inner cylindrical member. The space portion is provided in the internal space between the stopper assembly and the inner cylindrical member, and can lower a resistance in pivot of the stopper assembly.

DESCRIPTION OF EMBODIMENTS

[Problems to be Solved by the Present Disclosure]

An air spring in an embodiment of the present invention will be explained below with reference to FIGS. 1 to 9. Firstly, problems of the air springs in PTD 1 (Japanese Patent Laying-Open No. 2000-035075), PTD 2 (Japanese Patent Laying-Open No. 2012-017769), and PTD 3 (Japanese Patent Laying-Open No. 2012-145135) described above will be explained.

Figure 1:
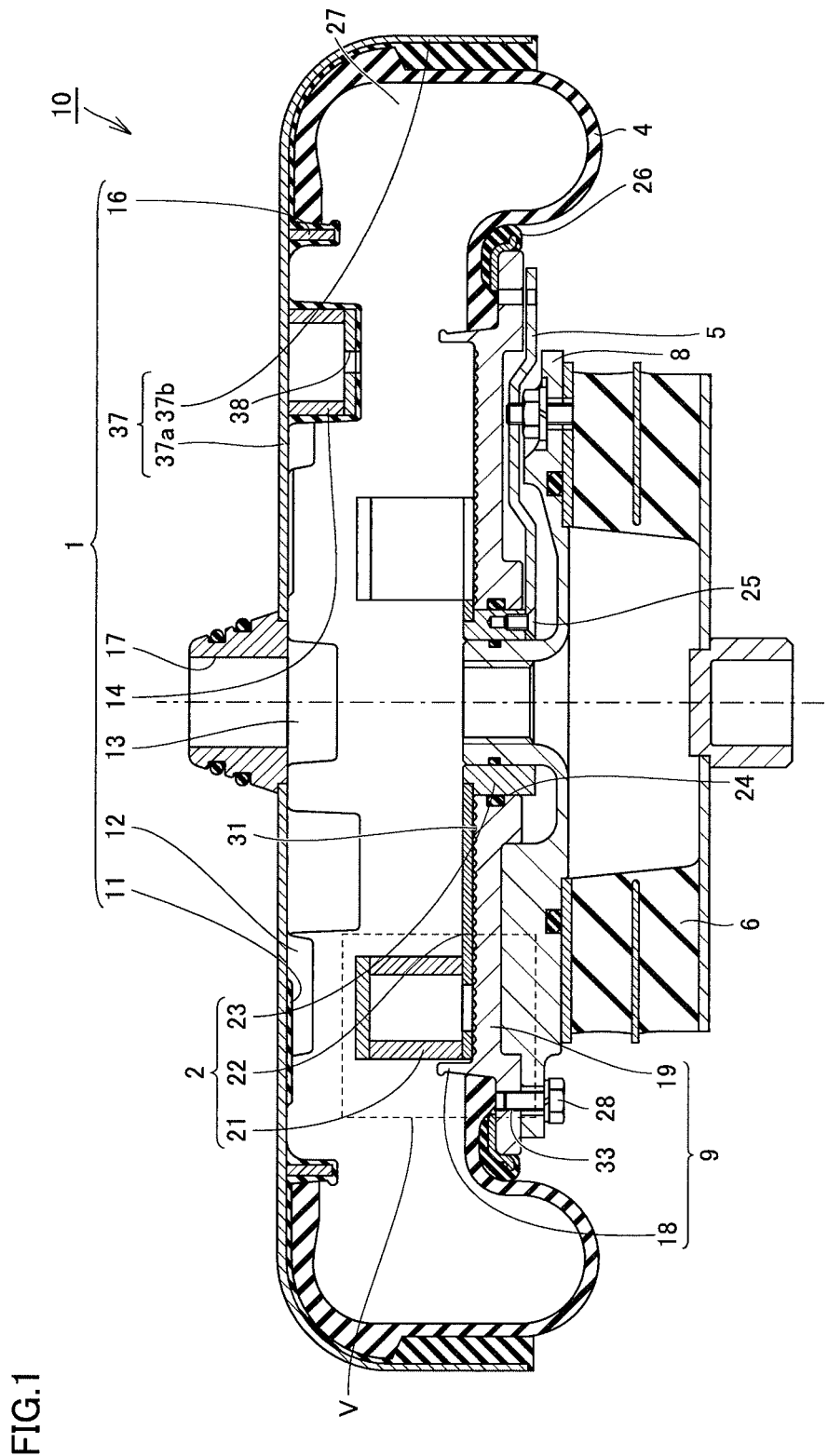
FIG. 1 is a cross-sectional view of an air spring in a first embodiment of the present invention.

Initially, the air spring described in PTD 1 will be explained. In this air spring, a stopper (8) can rotationally be operated around a shaft portion (2a) of a lower plate (2). As shown in FIG. 1 of PTD 1, however, the entire bottom surface of a base (8a) of the stopper (8) is in contact with a flat surface of an inner cylindrical member (4) and hence an area of contact therebetween is great. Therefore, a sliding resistance in rotational operation of the stopper (8) is high. In particular, since the stopper (8) is arranged in a hermetically sealed space in the air spring described in PTD 1, a pressure in the hermetically sealed space is applied to the stopper (8) and the sliding resistance further increases.

The air spring described in PTD 2 includes a lower stop member (12). This lower stop member (12) can move from a first stopper position (a stand-by position) shown in FIG. 2 (a) of PTD 2 to a second stopper position (a raised position) shown in FIG. 2 (b). In this air spring, a slide plate (20) is interposed between an upper plate portion (2A) and each lower stop member (12) such that each lower stop member (12) smoothly moves, however, the slide plate (20) comes in contact with substantially the entire surface of both of the upper plate portion (2A) and each lower stop member (12). Therefore, as in PTD 1, an area of contact is again great. In addition, since a pressure in the hermetically sealed space is applied, a sliding resistance in pivot of the lower stop member (12) is high as in PTD 1.

The air spring described in PTD 3 includes a lower stopper (16). A movable body (7) of this lower stopper (16) can rotationally be operated around a central axis (18). In a rotational operation of the movable body (7), a taper (32) of the movable body (7) and a taper (41) of a holding body (8) slide with respect to each other. Therefore, as in PTDs 1 and 2, an area of contact between the movable body (7) and the holding body (8) is again great. Additionally, a pressure in the hermetically sealed space is applied. Therefore, as in PTDs 1 and 2, a sliding resistance in a rotational operation of the movable body (7) is high.

[Effects of the Present Disclosure]

The air spring in the present embodiment can solve the problems of the air springs described in PTDs 1 to 3 as above. The air spring in the present embodiment can be used in various applications such as a suspension, a vibration isolator, and a vehicle height controller. When the air spring is employed in railway vehicles, it is attached between a vehicle and a bogie unit (a bogie and wheels) and vibration transmitted from the wheels to the vehicle can be mitigated.

The air spring in the present embodiment is a self-sealing air spring, and includes an outer cylindrical member, an inner cylindrical member combined with the outer cylindrical member, and a diaphragm coupling the outer cylindrical member and the inner cylindrical member to each other and providing an internal space between the outer cylindrical member and the inner cylindrical member. The outer cylindrical member and the inner cylindrical member can be made of a rigid material such as a metal or fiberglass reinforced plastics. The diaphragm can be made of an elastic material such as rubber and elastomer. The internal space is hermetically sealed and pressurized air is sealed in the internal space.

The air spring in the present embodiment also includes a stopper assembly arranged in the internal space as being pivotable over the inner cylindrical member, the stopper assembly allowing suppression of movement of the outer cylindrical member toward the inner cylindrical member more than necessary, and a pivoting mechanism pivoting the stopper assembly over the inner cylindrical member. The stopper assembly may be driven manually or with motive power from a motive power source. In the air spring in the present embodiment, an area of contact between the stopper assembly and the inner cylindrical member is decreased. Thus, a mechanical resistance between the stopper assembly and the inner cylindrical member in pivoting the stopper assembly can be lowered and a sliding resistance therebetween can be lowered. For decreasing an area of contact between the stopper assembly and the inner cylindrical member, in the present embodiment, a space portion is provided between the stopper assembly and the inner cylindrical member so as to decrease an area of contact between the stopper assembly and the inner cylindrical member.

[Description of Embodiments of the Invention of the Present Application]

Embodiments of the invention of the present application will initially be listed and described.

(1) An air spring 10 according to one manner of the present invention includes an outer cylindrical member 1, an inner cylindrical member 9, a diaphragm 4, a stopper assembly 2, a pivoting mechanism 5, and a space portion 3. Inner cylindrical member 9 is combined with outer cylindrical member 1. Diaphragm 4 couples outer cylindrical member 1 and inner cylindrical member 9 to each other and provides an internal space 27 between outer cylindrical member 1 and inner cylindrical member 9. Stopper assembly 2 is arranged in internal space 27 as being pivotable over inner cylindrical member 9 and can suppress movement of outer cylindrical member 1 toward inner cylindrical member 9 more than necessary. Pivoting mechanism 5 pivots stopper assembly 2 over inner cylindrical member 9. Space portion 3 is provided between stopper assembly 2 and inner cylindrical member 9 and can lower a resistance in pivot of stopper assembly 2. Thus, difficulty in pivot of stopper assembly 2 by being pressed against inner cylindrical member 9 by a pressure in internal space 27 can be suppressed.

(2) Air spring 10 according to (1) may include a communication path 31 allowing communication between space portion 3 and internal space 27.

(3) In air spring 10 according to (1) or (2), stopper assembly 2 may be arranged on a surface of inner cylindrical member 9. Stopper assembly 2 may have a stopper portion 21 which can suppress movement of outer cylindrical member 1 and a base portion 22 carrying stopper portion 21. Space portion 3 may be provided between base portion 22 and the surface of inner cylindrical member 9.

(4) In air spring 10 according to (3), a recess portion 36 may be provided in at least one of a surface in base portion 22 located on a side of the inner cylindrical member and the surface of inner cylindrical member 9. Space portion 3 may be defined by at least a part of recess portion 36.

(5) In air spring 10 according to (3), a projection portion 29 may be provided on at least one of a surface in base portion 22 located on a side of the inner cylindrical member and the surface of inner cylindrical member 9. Projection portion 29 may define space portion 3 between base portion 22 and inner cylindrical member 9.

(6) In air spring 10 according to (5), at least a tip end portion of projection portion 29 may be composed of a material allowing a coefficient of friction between projection portion 29 and base portion 22 or inner cylindrical member 9 to be smaller than a coefficient of friction between base portion 22 and inner cylindrical member 9.

(7) In air spring 10 according to (1) or (2), the space portion may be provided by arranging an antifriction material 34 between stopper assembly 2 and inner cylindrical member 9.

(8) In air spring 10 according to (1), in the internal space, stopper assembly 2 may include an internal chamber 15 separate from internal space 27. Internal space 27 and internal chamber 15 may communicate with each other through space portion 3.

(9) In air spring 10 according to (1), stopper assembly 2 may have stopper portion 21 which can suppress movement of outer cylindrical member 1 and base portion 22 carrying stopper portion 21. Stopper portion 21 may contain internal chamber 15. A communication hole 20 allowing communication between the internal chamber and the space portion may be provided in base portion 22.

(10) A bogie according to one manner of the present disclosure includes the air spring according to any of (1) to (9). Thus, even when vibration is applied in a direction perpendicular to a direction from the outer cylindrical member to the inner cylindrical member, break of the air spring can be suppressed.

[Details of Embodiments of the Invention of the Present Application]

Details of the embodiments of the invention of the present application will now be described.

(First Embodiment)

FIG. 1 shows an air spring in a first embodiment of the present invention. As shown in FIG. 1, air spring 10 mainly has outer cylindrical member 1, inner cylindrical member 9, diaphragm 4, stopper assembly 2, pivoting mechanism 5, and space portion 3. Outer cylindrical member 1 has an upper plate 37, a plurality of protrusion portions 11 to 14 protruding from upper plate 37, and a ring-shaped projection portion 16 rising from upper plate 37 and located outside protrusion portions 11 to 14. Upper plate 37 has a flat plate portion 37a in a central portion and a sidewall portion 37b in a circumferential edge portion. A hole portion is provided in the central portion of flat plate portion 37a of upper plate 37 and a coupling portion 17 is attached to the hole portion. Protrusion portions 11 to 14 are in a substantially cylindrical shape and different in height from one another as shown in FIG. 1. Though protrusion portions 11 to 14 are hollow in the example in FIG. 1, they may be solid. A through hole 38 communicating with internal space 27 may be provided in protrusion portion 14.

As shown in FIG. 1, inner cylindrical member 9 includes a hole portion 24 provided in a central portion, a lower plate 19 having an upper surface portion around hole portion 24, and a flange portion 18 rising from lower plate 19. Stopper assembly 2 is arranged on the upper surface portion of lower plate 19. Stopper assembly 2 has a plurality of stopper portions 21 in a cylindrical shape, base portion 22 carrying stopper portion 21, and a ring portion 23 inserted in hole portion 24 in the central portion of lower plate 19. Stopper portion 21 has a function to suppress movement of outer cylindrical member 1 toward inner cylindrical member 9 by a prescribed amount or more. A groove portion 31 is provided in the upper surface portion of lower plate 19. Details of groove portion 31 will be described later.

As shown in FIG. 1, diaphragm 4 couples outer cylindrical member 1 and inner cylindrical member 9 to each other and provides internal space 27 therebetween. A portion of diaphragm 4 on one end side extends along sidewall portion 37b and flat plate portion 37a of outer cylindrical member 1 and one end of diaphragm 4 abuts on ring-shaped projection portion 16 of outer cylindrical member 1. The other end of diaphragm 4 is located on a circumferential edge portion of inner cylindrical member 9 and abuts on flange portion 18 of inner cylindrical member 9. Thus, internal space 27 of air spring 10 can hermetically be sealed. A rubber seat 26 is arranged between diaphragm 4 and the circumferential edge portion of inner cylindrical member 9.

A bottom plate 8 is arranged under inner cylindrical member 9. Bottom plate 8 has a cylindrical portion in its central portion and the cylindrical portion is inserted in ring portion 23 of stopper assembly 2. A screw hole 33 is provided in inner cylindrical member 9, and bottom plate 8 can be fixed to inner cylindrical member 9 by screwing a bolt 28 inserted into bottom plate 8 into screw hole 33. A lever 5 for pivotally operating stopper assembly 2 is disposed between inner cylindrical member 9 and bottom plate 8. One end of lever 5 is fixed to ring portion 23 by a screw 25. A handle may be attached to the other end of lever 5 such that lever 5 can pivotally be operated with a hand. The other end of lever 5 is located outside bottom plate 8. Laminated rubber 6 is arranged under bottom plate 8.

Figure 2:
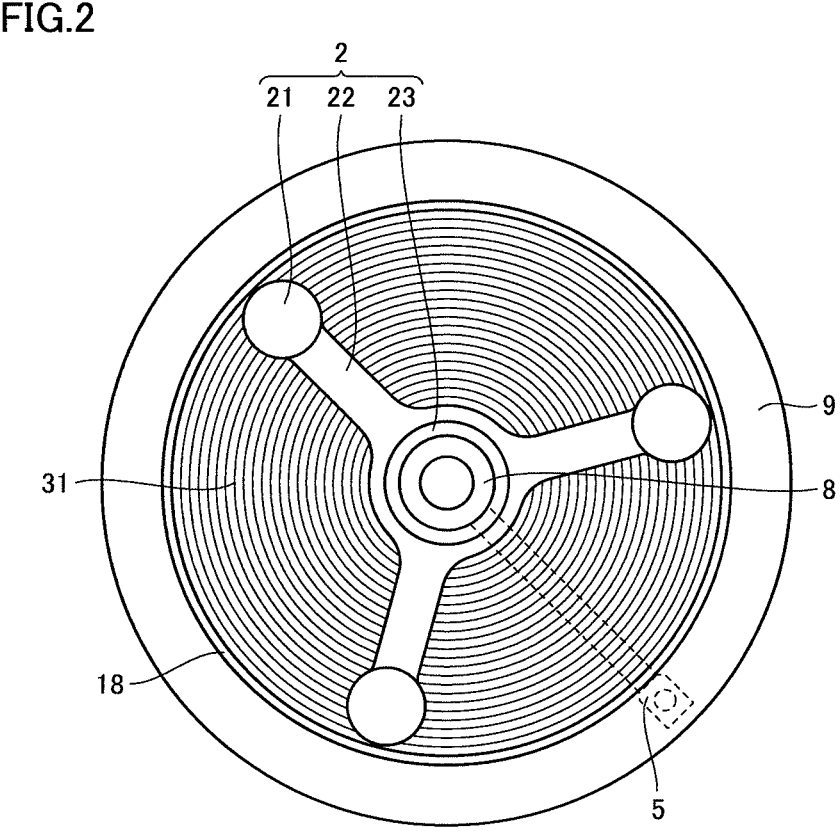
FIG. 2 is a plan view showing a stopper assembly and an inner cylindrical member shown in FIG. 1.

FIG. 2 shows an exemplary internal structure of inner cylindrical member 9. As shown in FIG. 2, a plurality of groove portions 31 are provided in the upper surface portion of lower plate 19 (see FIG. 1) of inner cylindrical member 9. In the example in FIG. 2, a plurality of annular groove portions 31 are provided at a distance from each other from the central portion to an outer circumferential portion of the upper surface portion of lower plate 19. In other words, the plurality of groove portions are arranged concentrically at a distance from each other. Therefore, at whichever position in a circumferential direction a trifurcated stopper assembly may be located, equal reaction force is applied to each branch of the trifurcated stopper assembly. The groove portions can readily be worked. Stopper assembly 2 includes three base portions 22 and stopper portion 21 is fixed onto an outer end portion of each base portion 22. Each of three base portions 22 extends from ring portion 23 toward the outer circumference. In a plan view, three stopper portions 21 are arranged, for example, at positions corresponding to 0°, 120°, and 240°.

Three base portions 22 are simultaneously pivoted by pivotally operating lever 5 and accordingly three stopper portions 21 are also simultaneously pivoted. Three base portions 22 slide over the upper surface portion of lower plate 19 of inner cylindrical member 9. By providing a plurality of groove portions 31 in the upper surface portion, a space portion can be provided under base portion 22. Thus, an area of contact between the upper surface portion of lower plate 19 of inner cylindrical member 9 and base portion 22 can be decreased. Consequently, a sliding resistance between the upper surface portion of lower plate 19 of inner cylindrical member 9 and base portion 22 can be lowered. In particular, when a plurality of base portions 22 are provided, an effect to lower a sliding resistance is noticeable.

As shown in FIG. 2, groove portion 31 extends from a portion directly under base portion 22 to a region not covered with base portion 22. Therefore, with groove portion 31, space portion 3 provided under base portion 22 can communicate with internal space 27. Groove portion 31 functions also as a communication path allowing communication between space portion 3 under base portion 22 and internal space 27. By thus allowing communication between space portion 3 under base portion 22 and internal space 27, force with which base portion 22 is pressed against lower plate 19 of inner cylindrical member 9 by a pressure in internal space 27 can be lowered, which can also contribute to lowering in sliding resistance.

Figure 3:
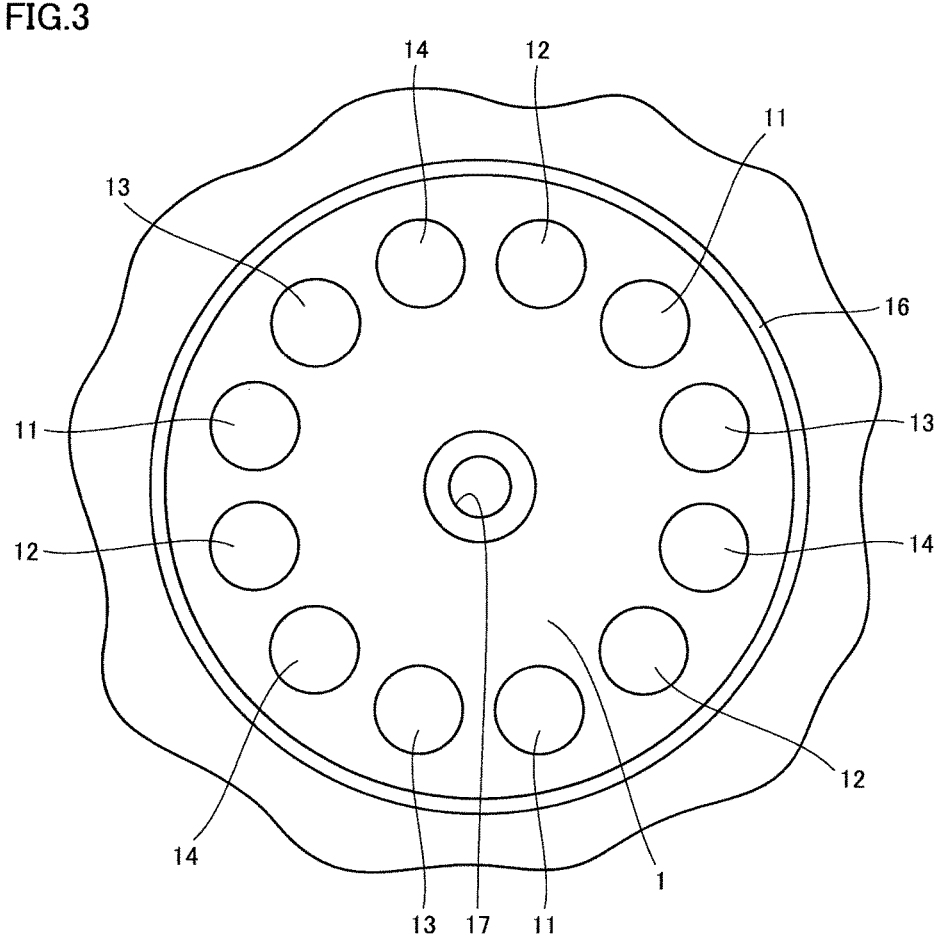
FIG. 3 is a partial plan view showing an internal structure of an outer cylindrical member shown in FIG. 1.

FIG. 3 shows an internal structure of outer cylindrical member 1. As shown in FIG. 3, in a plan view, protrusion portions 11 to 14 at four heights are arranged at an equal interval. In the example in FIG. 3, three sets of four types of protrusion portions 11 to 14 different in height from one another are provided. Each of the plurality of protrusion portions 11 to 14 is provided inside ring-shaped projection portion 16 and outside coupling portion 17. Each of the plurality of protrusion portions 11 to 14 is annularly provided.

Figure 4:
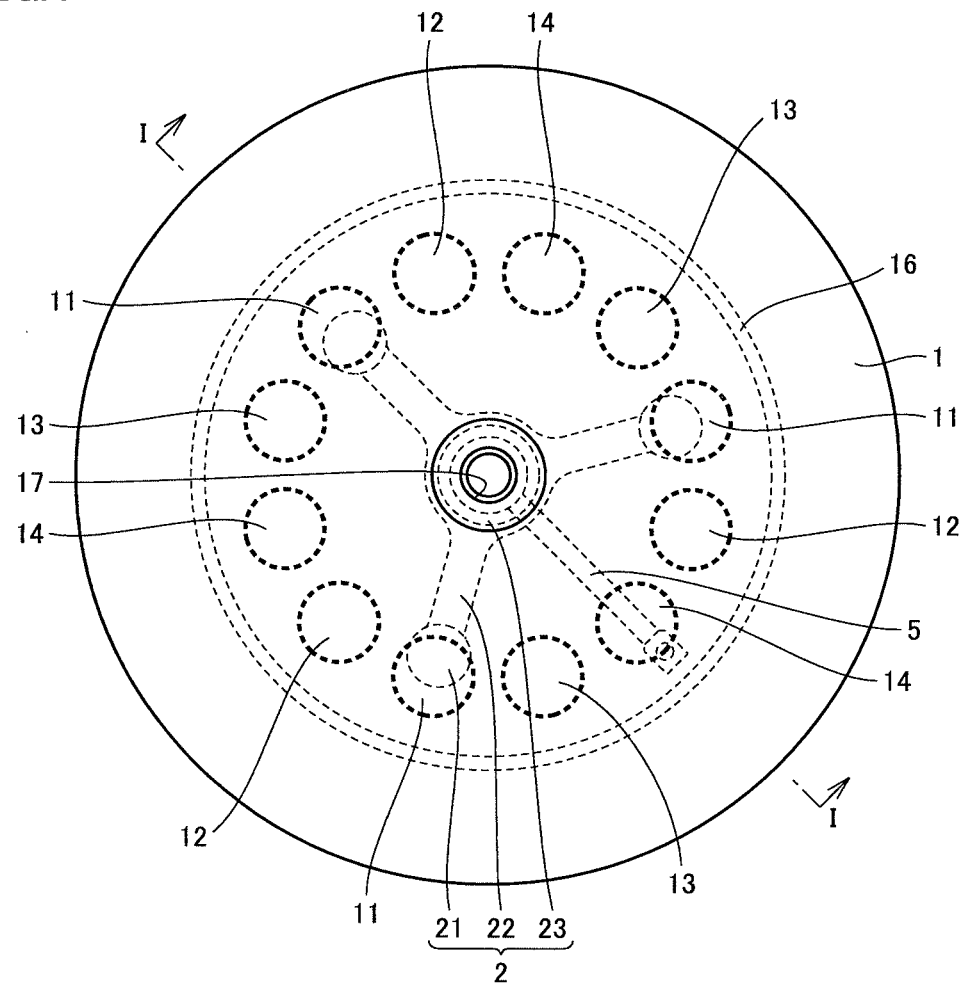
FIG. 4 is an illustrative diagram for illustrating an operation of the stopper assembly shown in FIG. 1.

FIG. 4 shows a perspective view of air spring 10 when viewed from a side of the outer cylindrical member. As shown in FIG. 4, three protrusion portions 11 equal in height are arranged at positions corresponding to three stopper portions 21 equal in height. Protrusion portions 12 to 14 are also similarly arranged. Thus, three stopper portions 21 can simultaneously be arranged at positions opposed to three protrusion portions 11 at the same height by pivoting three stopper portions 21. When outer cylindrical member 1 is lowered toward inner cylindrical member 9, three protrusion portions 11 are born by three stopper portions 21.

Figure 5:
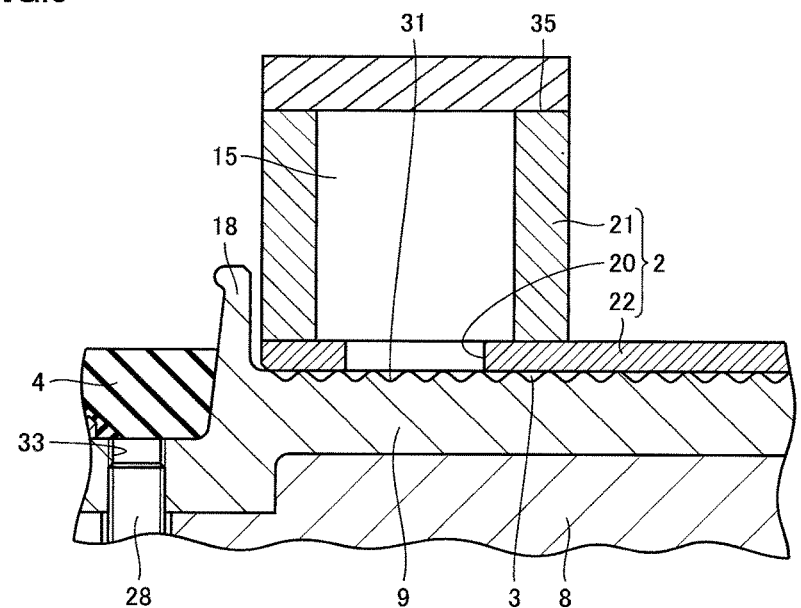
FIG. 5 is an enlarged view of a region V in FIG. 1.

FIG. 5 shows an enlarged view of stopper portion 21 and the vicinity thereof. As shown in FIG. 5, stopper portion 21 contains internal chamber 15. Internal chamber 15 is an independent space which is provided in internal space 27 and is separate from internal space 27. In the example in FIG. 5, internal chamber 15 is defined by a part of base portion 22 and a sidewall and an upper wall of stopper portion 21. Communication hole 20 is provided in base portion 22 located directly under stopper portion 21. Communication hole 20 can allow communication between internal chamber 15 and space portion 3 under base portion 22.

As shown in FIG. 5, the upper wall of stopper portion 21 is joined to the sidewall of stopper portion 21 with a welded portion 35 being interposed. A temperature in internal chamber 15 is high immediately after welding. For example, when internal chamber 15 is completely closed, an unfavorable condition tends to occur in welded portion 35 when a temperature in internal chamber 15 lowers after formation of welded portion 35. By providing communication hole 20 as above, however, internal chamber 15 can communicate with space portion 3. Since groove portion 31 communicates with internal space 27 in the present embodiment, internal chamber 15 can communicate with internal space 27. Thus, a pressure in internal chamber 15 is substantially equal to a pressure in internal space 27. Consequently, an unfavorable condition is less likely to occur in welded portion 35.

Though internal space 27 and internal chamber 15 communicate with each other through space portion 3 in the example shown in FIG. 5, the concept in the present embodiment is applicable also to an example in which a space other than internal chamber 15 is located in internal space 27.

(Second Embodiment)

Figure 6:
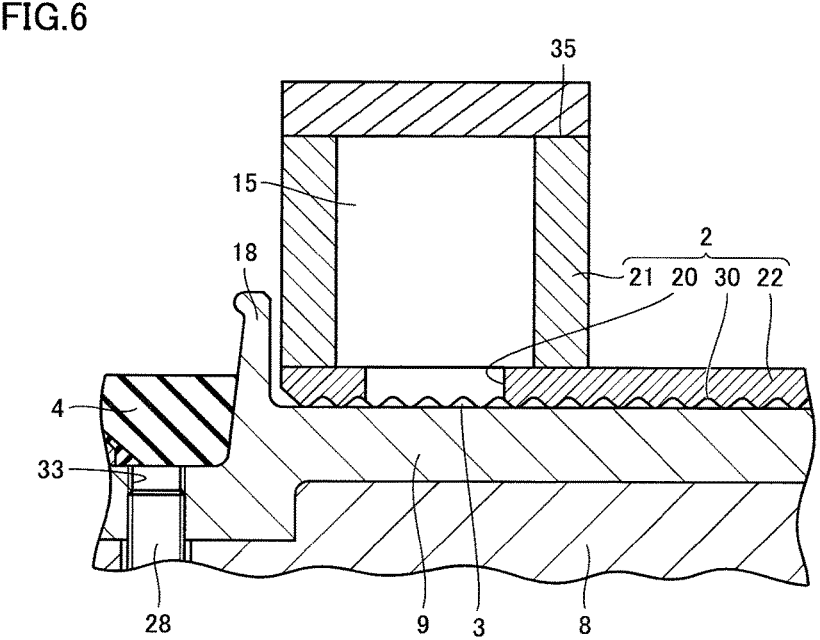
FIG. 6 is a partial cross-sectional view of the air spring in a second embodiment of the present invention.

A second embodiment of the present invention will now be described with reference to FIGS. 6 and 7. FIG. 6 is a cross-sectional view showing stopper portion 21 and the vicinity thereof in the air spring in the present second embodiment.

As shown in FIG. 6, a groove portion 30 is provided on a side of base portion 22 of stopper assembly 2 in the present second embodiment. Specifically, groove portion 30 is provided in a lower surface of base portion 22 facing the upper surface portion of lower plate 19 of inner cylindrical member 9. In this case as well, space portion 3 can be provided under base portion 22 so that a sliding resistance between the upper surface portion of lower plate 19 of inner cylindrical member 9 and base portion 22 can be lowered. Groove portion 30 communicates with internal chamber 15 through communication hole 20. As shown in FIG. 6, the upper surface portion of lower plate 19 may be flat.

Figure 7:
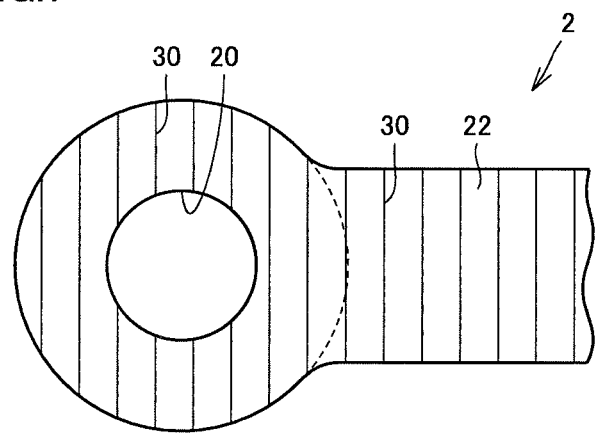
FIG. 7 is a partially enlarged bottom view of the stopper assembly shown in FIG. 6.

FIG. 7 shows an exemplary structure of the lower surface of base portion 22. As shown in FIGS. 6 and 7, a plurality of linear groove portions 30 are provided in the lower surface of base portion 22 at a distance from each other in the present second embodiment. Groove portion 30 preferably reaches a side end portion of base portion 22. Space portion 3 under base portion 22 can thus communicate with internal space 27. Groove portion 30 may be linear or in an arc shape. Groove portion 30 may extend in a direction intersecting with a straight line connecting stopper portion 21 and ring portion 23 to each other. Groove portion 30 preferably reaches communication hole 20. When groove portion 30 is provided in base portion 22 as above, a worked area is smaller than in an example in which a groove portion is provided in lower plate 19 of inner cylindrical member 9 and hence working is facilitated.

The construction other than the above is the same as in the first embodiment. Groove portion 31 can be provided in the upper surface portion of lower plate 19 of inner cylindrical member 9 also in the present second embodiment as in the first embodiment. A groove portion should only be provided in at least one of base portion 22 and the upper surface portion of lower plate 19 of inner cylindrical member 9.

(Third Embodiment)

Figure 8:
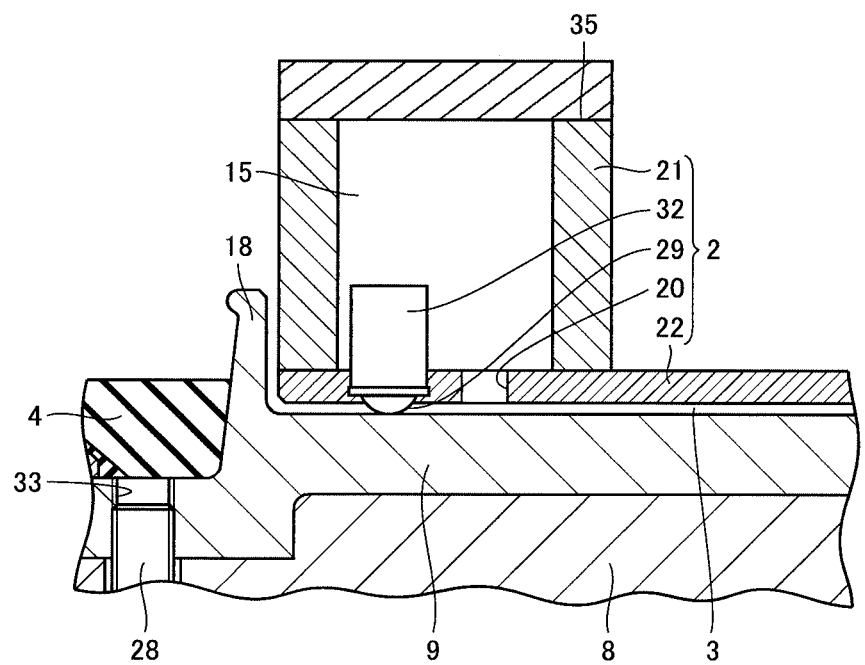
FIG. 8 is a partial cross-sectional view of the air spring in a third embodiment of the present invention.

A third embodiment of the present invention will now be described with reference to FIG. 8. FIG. 8 is a cross-sectional view showing stopper portion 21 and the vicinity thereof in the air spring in the present third embodiment.

As shown in FIG. 8, a plunger 32 is attached to base portion 22 of stopper assembly 2 in the present third embodiment. Plunger 32 is provided to pass through base portion 22 and protrudes from the lower surface of base portion 22. As plunger 32 protrudes from the lower surface of base portion 22, space portion 3 can be provided under base portion 22. A sliding resistance between the upper surface portion of lower plate 19 of inner cylindrical member 9 and base portion 22 can thus be lowered. Preferably, a projection portion 29 of plunger 32 has a curved surface (a spherical surface) and comes in point contact with the upper surface portion. A sliding resistance between projection portion 29 and the upper surface portion of lower plate 19 can thus further be lowered. Preferably, a plurality of projection portions 29 are provided. A load applied onto a vehicular body can thus be distributed to the plurality of projection portions 29. Since the load applied onto the vehicular body is born as being distributed, depression of the inner cylindrical member can be suppressed.

In the example in FIG. 8, a projection portion is provided in the lower surface of base portion 22 by attaching plunger 32 to base portion 22 such that the tip end thereof protrudes from the lower surface of base portion 22, and space portion 3 is thus provided under base portion 22 by making use of this projection portion. A projection portion, however, may be provided in the lower surface of base portion 22 by attaching any member other than plunger 32 to the lower surface of base portion 22.

Space portion 3 may be provided under base portion 22 by providing a projection portion on a side of the upper surface portion of lower plate 19 of inner cylindrical member 9. Furthermore, a projection portion may be provided in both of base portion 22 and the upper surface portion of the lower plate.

At least the tip end portion of the projection portion is preferably composed of a material allowing a coefficient of friction between the projection portion and base portion 22 or the upper surface portion of the lower plate of inner cylindrical member 9 to be smaller than a coefficient of friction between base portion 22 and the upper surface portion of lower plate 19 of inner cylindrical member 9. Thus, a sliding resistance between the upper surface portion of lower plate 19 of inner cylindrical member 9 and base portion 22 can further be lowered. Examples of a material which can lower a coefficient of friction include a resin such as polytetrafluoroethylene (PTFE).

(Fourth Embodiment)

Figure 9:
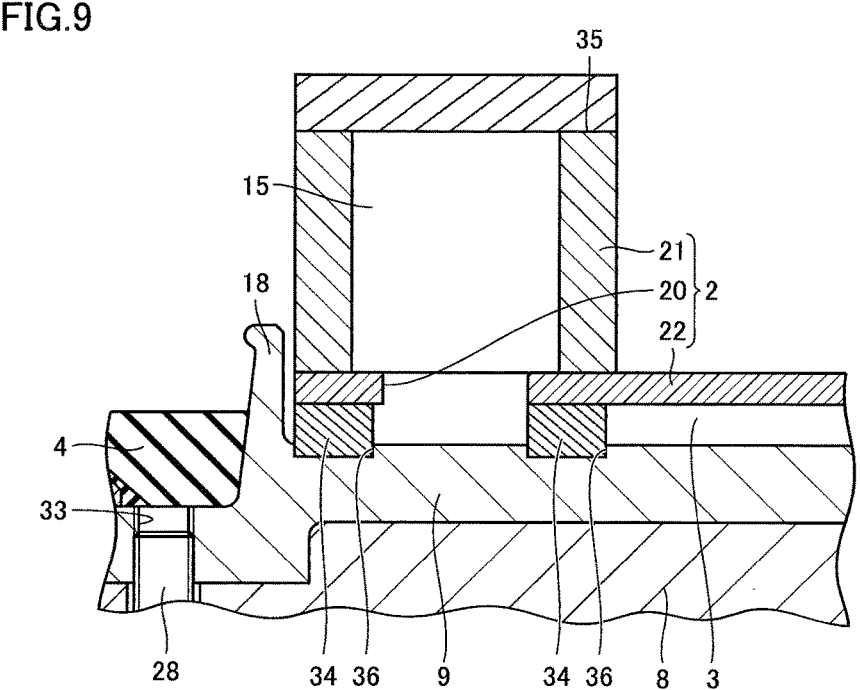
FIG. 9 is a partial cross-sectional view of the air spring in a fourth embodiment of the present invention.

A fourth embodiment of the present invention will now be described with reference to FIG. 9. FIG. 9 is a cross-sectional view showing stopper portion 21 and the vicinity thereof in the air spring in the present fourth embodiment.

As shown in FIG. 9, in the present fourth embodiment, space portion 3 is provided between base portion 22 and the upper surface portion of lower plate 19 of inner cylindrical member 9 with an antifriction material 34 being disposed between base portion 22 of stopper assembly 2 and the upper surface portion of lower plate 19 of inner cylindrical member 9. In this case as well, a sliding resistance between the upper surface portion of the lower plate of inner cylindrical member 9 and base portion 22 can be lowered. Antifriction material 34 refers to a material allowing a coefficient of friction between antifriction material 34 and base portion 22 or the upper surface portion of the lower plate of inner cylindrical member 9 to be smaller than a coefficient of friction between base portion 22 and the upper surface portion of lower plate 19 of inner cylindrical member 9.

In the example in FIG. 9, a recess portion 36 which can receive antifriction material 34 is provided in the upper surface portion of lower plate 19 of inner cylindrical member 9 and antifriction material 34 is fitted into recess portion 36. As antifriction material 34 extends in a circumferential direction of the upper surface portion of lower plate 19 of inner cylindrical member 9, antifriction material 34 can be used as a guide in a pivotal operation of stopper assembly 2. Antifriction material 34 may be in various shapes such as an arc shape or an annular shape.

Antifriction material 34 may be attached to the lower surface of base portion 22 or to both of the lower surface of base portion 22 and the upper surface portion of the lower plate of inner cylindrical member 9. When antifriction material 34 is attached to the lower surface of base portion 22, a recess portion which can receive antifriction material 34 is preferably provided in the lower surface of base portion 22.

(Fifth Embodiment)

A construction of a bogie according to a fifth embodiment will be described below.

Figure 10:
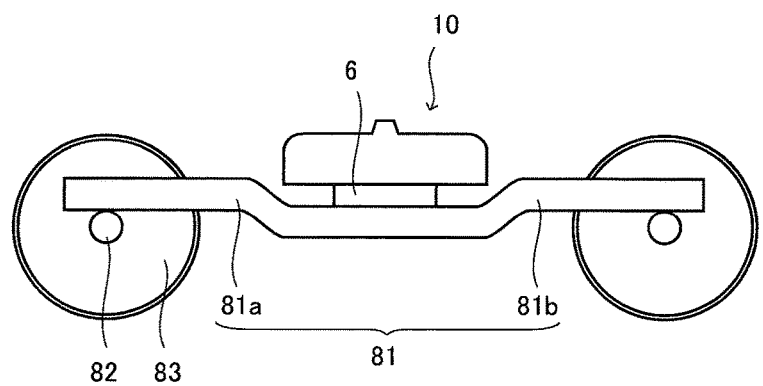
FIG. 10 is a side view of a bogie according to a fifth embodiment of the present invention.

FIG. 10 is a side view of a bogie according to the fifth embodiment. As shown in FIG. 10, the bogie according to the fifth embodiment has air spring 10, a bogie frame 81, an axle 82, and a wheel 83. Bogie frame 81 has a lateral beam 81a and a lateral beam 81b. Wheels 83 are attached to opposing ends of axle 82. Axle 82 is attached to bogie frame 81. More specifically, bogie frame 81 is attached to axles 82 as lateral beam 81a and lateral beam 81b are received and supported by axles 82 with axle springs (not shown) being interposed. Air spring 10 is an air spring according to any of the first to fourth embodiments. Air spring 10 is attached to bogie frame 81. More specifically, a side of laminated rubber 6 of air spring 10 is attached to bogie frame 81.

An effect of the bogie according to the fifth embodiment will be described below As set forth above, the bogie according to the fifth embodiment has air spring 10 according to any of the first to fourth embodiments. Therefore, according to the bogie in the fifth embodiment, break of air spring 10 can be suppressed even when vibration is applied to a direction perpendicular to the direction from outer cylindrical member 1 toward inner cylindrical member 2.

Though the embodiments of the present invention have been described as above, combination of features in each embodiment as appropriate is also originally intended. It should be understood that the embodiments disclosed herein are illustrative and non-restrictive in every respect. The scope of the present invention is defined by the terms of the claims and is intended to include any modifications within the scope and meaning equivalent to the terms of the claims.

REFERENCE SIGNS LIST 1 outer cylindrical member; 2 stopper assembly; 3 space portion; 4 diaphragm; 5 lever (pivoting mechanism); 6 laminated rubber; 8 bottom plate; 9 inner cylindrical member; 10 air spring; 11, 12, 13, 14 protrusion portion; 15 internal chamber; 16 ring-shaped projection portion; 17 coupling portion; 18 flange portion; 19 lower plate; 20 communication hole; 21 stopper portion; 22 base portion; 23 ring portion; 24 hole portion; 25 screw; 26 rubber seat; 27 internal space; 28 bolt; 29 projection portion; 30, 31 groove portion; 32 plunger; 33 screw hole; 34 antifriction material; 35 welded portion; 36 recess portion; 37 upper plate; 37a flat plate portion; 37b sidewall portion; 38 through hole; 81 bogie frame; 82 axle; and 83 wheel.

The invention claimed is:

1. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;
a stopper assembly arranged in the internal space as being pivotable over the inner cylindrical member, the stopper assembly allowing suppression of movement of the outer cylindrical member toward the inner cylindrical member more than necessary;
a pivoting mechanism pivoting the stopper assembly over the inner cylindrical member;
a space portion provided between the stopper assembly and the inner cylindrical member, the space portion allowing lowering in resistance in pivot of the stopper assembly; and
a communication path allowing communication between the space portion and the internal space.

2. A bogie comprising the air spring according to claim 1.

3. The air spring according to claim 1, wherein
the stopper assembly is arranged on a surface of the inner cylindrical member,
the stopper assembly has a stopper portion which can suppress movement of the outer cylindrical member and a base portion carrying the stopper portion, and
the space portion is provided between the base portion and the surface of the inner cylindrical member.

4. The air spring according to claim 3, wherein
a recess portion is provided in at least one of a surface in the base portion located on a side of the inner cylindrical member and the surface of the inner cylindrical member, and
the space portion is defined by at least a part of the recess portion.

5. The air spring according to claim 3, wherein
a projection portion is provided in at least one of a surface in the base portion located on a side of the inner cylindrical member and the surface of the inner cylindrical member, and
the projection portion defines the space portion between the base portion and the inner cylindrical member.

6. The air spring according to claim 1, wherein
the space portion is provided by arranging an antifriction material between the stopper assembly and the inner cylindrical member.

7. An air spring comprising:
an outer cylindrical member;
an inner cylindrical member combined with the outer cylindrical member;
a diaphragm coupling the outer cylindrical member and the inner cylindrical member to each other, the diaphragm providing an internal space between the outer cylindrical member and the inner cylindrical member;
a stopper assembly arranged in the internal space as being pivotable over the inner cylindrical member, the stopper assembly allowing suppression of movement of the outer cylindrical member toward the inner cylindrical member more than necessary;
a pivoting mechanism pivoting the stopper assembly over the inner cylindrical member; and
a space portion provided between the stopper assembly and the inner cylindrical member, the space portion allowing lowering in resistance in pivot of the stopper assembly, wherein
the stopper assembly is arranged on a surface of the inner cylindrical member,
the stopper assembly has a stopper portion which can suppress movement of the outer cylindrical member and a base portion carrying the stopper portion,
the space portion is provided between the base portion and the surface of the inner cylindrical member,
a projection portion is provided in at least one of a surface in the base portion located on a side of the inner cylindrical member and the surface of the inner cylindrical member,
the projection portion defines the space portion between the base portion and the inner cylindrical member, and
at least a tip end portion of the projection portion is composed of a material allowing a coefficient of friction between the projection portion and the base portion or the inner cylindrical member to be smaller than a coefficient of friction between the base portion and the inner cylindrical member.

8. An air spring comprising:

an outer cylindrical member;

an inner cylindrical member combined with the outer cylindrical member;

a diaphragm coupling the outer cylindrical member and the inner cylindrical member to each other, the diaphragm providing an internal space between the outer cylindrical member and the inner cylindrical member;

a stopper assembly arranged in the internal space as being pivotable over the inner cylindrical member, the stopper assembly allowing suppression of movement of the outer cylindrical member toward the inner cylindrical member more than necessary;

a pivoting mechanism pivoting the stopper assembly over the inner cylindrical member; and a space portion provided between the stopper assembly and the inner cylindrical member, the space portion allowing lowering in resistance in pivot of the stopper assembly, wherein in the internal space, the stopper assembly includes an internal chamber separate from the internal space, and the internal space and the internal chamber communicate with each other through the space portion.

9. An air spring comprising:

an outer cylindrical member;

an inner cylindrical member combined with the outer cylindrical member;

a diaphragm coupling the outer cylindrical member and the inner cylindrical member to each other, the diaphragm providing an internal space between the outer cylindrical member and the inner cylindrical member;

a stopper assembly arranged in the internal space as being pivotable over the inner cylindrical member, the stopper assembly allowing suppression of movement of the outer cylindrical member toward the inner cylindrical member more than necessary;

a pivoting mechanism pivoting the stopper assembly over the inner cylindrical member; and a space portion provided between the stopper assembly and the inner cylindrical member, the space portion allowing lowering in resistance in pivot of the stopper assembly, wherein the stopper assembly has a stopper portion which can suppress movement of the outer cylindrical member and a base portion carrying the stopper portion, the stopper portion contains an internal chamber, and a communication hole allowing communication between the internal chamber and the space portion is provided in the base portion.

\* \* \* \* \*